(12) United States Patent
Jenssen et al.

(10) Patent No.: US 10,581,087 B2
(45) Date of Patent: Mar. 3, 2020

(54) FUEL CELL AND MOTOR VEHICLE

(71) Applicant: Audi AG, Ingolstadt (DE)

(72) Inventors: Dirk Jenssen, Braunschweig (DE); Christian Martin Zillich, Braunschweig (DE)

(73) Assignee: AUDI AG, Ingolstadt (DE)

( * ) Notice: Subject to any disclaimer, the term of this patent is extended or adjusted under 35 U.S.C. 154(b) by 333 days.

(21) Appl. No.: 15/507,728

(22) PCT Filed: Jul. 24, 2015

(86) PCT No.: PCT/EP2015/067054
§ 371 (c)(1),
(2) Date: Feb. 28, 2017

(87) PCT Pub. No.: WO2016/034334
PCT Pub. Date: Mar. 10, 2016

(65) Prior Publication Data
US 2017/0309926 A1    Oct. 26, 2017

(30) Foreign Application Priority Data
Sep. 4, 2014   (DE) .......................... 10 2014 217 700

(51) Int. Cl.
*H01M 8/0228*  (2016.01)
*H01M 8/0245*  (2016.01)
(Continued)

(52) U.S. Cl.
CPC .............. *H01M 8/0228* (2013.01); *C23C 4/10* (2013.01); *H01M 8/026* (2013.01);
(Continued)

(58) Field of Classification Search
None
See application file for complete search history.

(56) References Cited

U.S. PATENT DOCUMENTS

| 2006/0040164 A1* | 2/2006 | Vyas | H01M 8/0206 429/518 |
| 2006/0099481 A1* | 5/2006 | Ji | H01M 8/0221 429/457 |

(Continued)

FOREIGN PATENT DOCUMENTS

| CN | 101989661 A | 3/2011 |
| CN | 102195048 A | 9/2011 |

(Continued)

*Primary Examiner* — Haroon S. Sheikh
(74) *Attorney, Agent, or Firm* — Seed Intellectual Property Law Group LLP

(57) ABSTRACT

The invention concerns a fuel cell (100), comprising a stack (1) of alternating bipolar plates (113) and membrane electrode assemblies (114) as well as flow channels (104, 105) that are designed between a bipolar plate (113) and a membrane electrode assembly (114) and flow channels (104, 105) that are designed within a bipolar plate (113) as well as a motor vehicle with such a fuel cell. Provision is made that a surface (101) of at least a part of the flow channels (104, 105) that is overflowable by a fluid has, regarding its direction of extension at least in part a hydrophobic segment (101a) and a hydrophilic segment (101b) with regard to a cross-section of the flow channel (104, 105).

11 Claims, 3 Drawing Sheets

Figure 1:
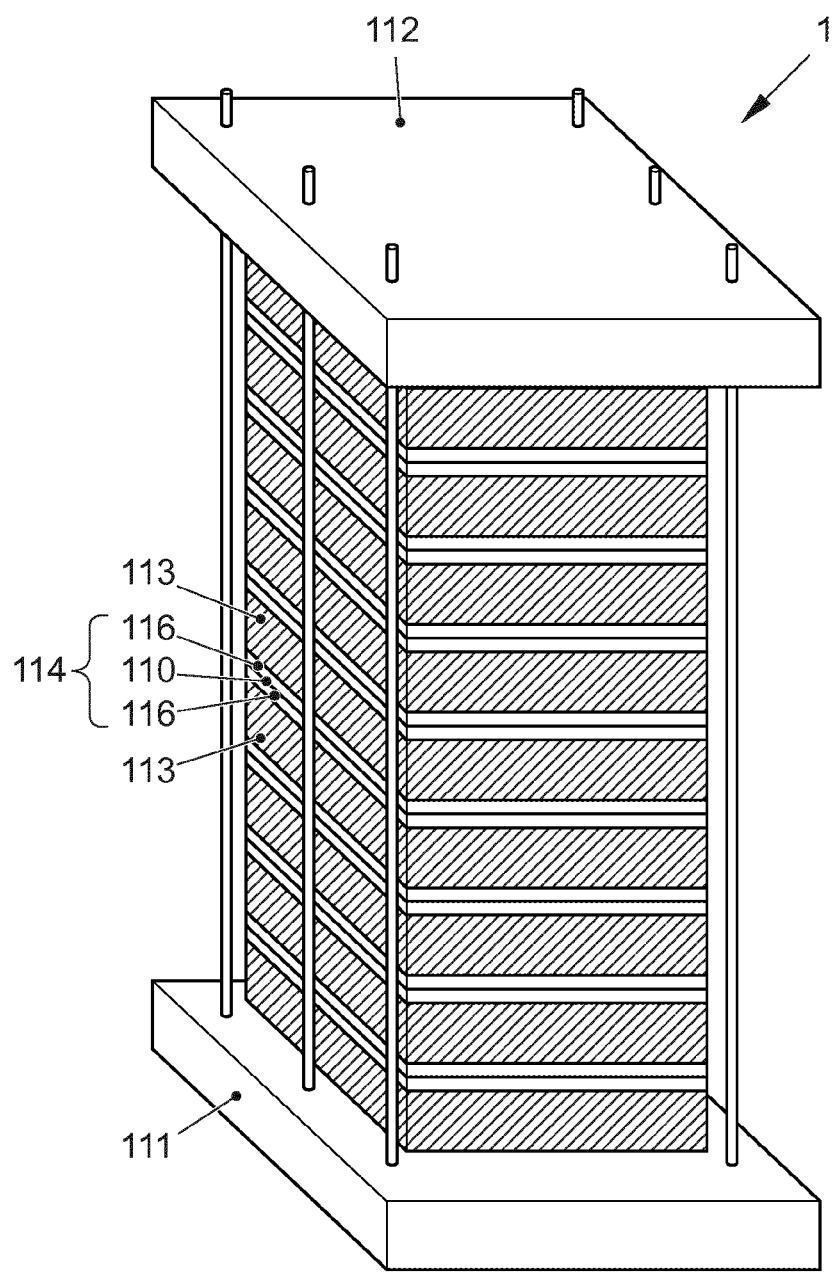

(51) Int. Cl.
*H01M 8/026* (2016.01)
*C23C 4/10* (2016.01)
*H01M 8/04119* (2016.01)
*H01M 8/04223* (2016.01)
*H01M 8/1018* (2016.01)

(52) U.S. Cl.
CPC ..... *H01M 8/0245* (2013.01); *H01M 8/04171* (2013.01); *H01M 8/04253* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 2008/0248368 A1* | 10/2008 | Dadheech | H01M 8/0206 429/483 |
| 2008/0292940 A1 | 11/2008 | Xie | |
| 2011/0229792 A1 | 9/2011 | Dadheech et al. | |
| 2012/0129060 A1 | 5/2012 | Nishikawa et al. | |

FOREIGN PATENT DOCUMENTS

| | | |
|---|---|---|
| DE | 11 2006 002 090 T5 | 6/2008 |
| DE | 10 2008 016 682 A1 | 12/2008 |
| DE | 10 2009 012 995 A1 | 10/2009 |
| DE | 10 2009 020 224 A1 | 12/2009 |
| DE | 10 2011 109 909 A1 | 2/2012 |
| WO | 01/61775 A2 | 8/2001 |
| WO | 2008/086819 A1 | 7/2008 |

\* cited by examiner

FUEL CELL AND MOTOR VEHICLE

The invention relates to a fuel cell comprising a stack of alternating bipolar plates and membrane electrode assemblies as well as flow channels that are designed between a bipolar plate and a membrane electrode assembly, and flow channels that are designed within a bipolar plate as well as a motor vehicle with such a fuel cell.

Fuel cells use the chemical conversion of a fuel with oxygen into water in order to generate electrical energy. For this reason, the core component of fuel cells are so-called membrane electrode assemblies (MEA) which are a compound of an ion-conductive, especially proton-conductive membrane and one electrode (anode and cathode) each, arranged on both sides of the membrane. Additionally, gas diffusion layers (GDL) may be arranged on both sides of the membrane electrode assembly on the sides of the electrodes facing away from the membrane. Usually, the fuel cell is formed by a plurality of MEAs arranged in a stack whose electrical power adds up. During operation of the fuel cell, the fuel, especially hydrogen $H_2$ or a gas mixture containing hydrogen is guided to the anode where an electrochemical oxidation of $H_2$ to $H^+$ with loss of electrons takes place. Via the electrolyte or the membrane that separates the reaction chambers gas-tightly from one another and electrically insulates them, the protons $H^+$ are transported from the anode chamber into the cathode chamber (water-bound or water-free). The electrons provided at the anode are guided to the cathode via an electrical line. The cathode receives oxygen or a gas mixture containing oxygen, so that a reduction of $O_2$ to $O^{2-}$ with gain of electrons takes place. At the same time, those oxygen anions react in the cathode chamber with the protons transported via the membrane while forming water. Due to the direct conversion of chemical into electrical energy, fuel cells have improved efficiency compared to other electricity generators because the Carnot factor is avoided.

The fuel cell is formed by a plurality of membrane electrode assemblies arranged in a stack, which is why this is also referred to as a fuel cell stack. A bipolar plate is arranged between each two membrane electrode assemblies, ensuring that the individual cells receive the operating media, i.e. the reactants and a coolant. In addition, the bipolar plates ensure an electrically conductive contact to the membrane electronic assemblies. Furthermore, they guarantee a sealed separation between anode and cathode chamber.

The bipolar plates usually consist of two profiled plates that have a structure in the form of an elevation profile arranged on both sides of the plates. This profile creates discrete flow channels on both side of the plates that are designed to guide operating media. The operating media themselves are separated by the plates, so that the coolant is guided inside the plate while the reactant gases are guided outside. The flow channels of the reactant gases on the one hand are limited by the respective plate and on the other by a membrane electrode assembly.

The start of a fuel cell system at low temperatures, especially at temperatures significantly below 0° C. can be problematic since there is water inside the fuel cell system. This water especially comes from fuel cell reaction, but may also be introduced into the system with the reactant gases of the fuel cell reaction, i.e. the anode or cathode gases. Since the fuel cell reaction is exothermic and the fuel cell system hence heats up automatically, its temperature falls again when switched off. During the cooling of the system, especially at low temperatures, the temperature may be lower than the dew point, and consequently the water vapor in the system may condense. If the temperatures are sufficiently low, the water freezes and may lead to fluidic and/or mechanical blockage in the pipe system. When the surfaces that are covered with ice start to melt in the perfused system, damage may occur due to ice particles that are torn off by the flow and move inside the system.

WO 2008/086819 A1 suggests as a solution to this problem that the components of the pipe system of a fuel cell, i.e. pipes with a free cross-section that is larger than a condensed water drop, as well as the movable elements for flow conduction (such as valves, pumps to move the gas flow) be coated hydrophilic in one segment of the internal cross-section, and hydrophobic in another segment of the internal cross-section. It has been described that this leads to condensing water being deposited on the hydrophobically coated part of the inner circumference of the pipe as drops, while the condensed water on the hydrophilically coated area of the inner circumference is distributed with a flat extension.

However, the flow channels inside a fuel cell stack have a diameter that is smaller than the diameter of a condensed water drop. Thus, even one drop, especially of frozen water, leads to the flow channel being blocked. In order to prevent blocking of the flow channel, it is therefore necessary to prevent the formation of drops as described above, since the blocking of the flow channels especially by frozen water drops leads to the fuel cell becoming inactive.

DE 10 2009 012 995 A1 therefore suggests that the flow channels in a fuel cell stack are alternately equipped with hydrophobic and hydrophilic segments along their longitudinal extension, and thus to favor the transport of water along the direction of extension of the flow channels. In contrast to this, WO 2008/086819 A1 suggests to provide the flow channels within the stack with a hydrophilic coating all over.

These embodiments have in common that due to the small diameter of the flow channels, capillary forces are generated that unfavorably affect the fuel cell system and impede or even prevent a discharge of water from the system.

The purpose of this invention is therefore to provide a fuel cell that eliminates the disadvantages of the prior art or at least reduces them. In particular, the purpose is to provide a fuel cell that has flow channels that substantially prevent a blockage of the flow channels of the fuel cell stack by liquid and/or frozen water.

This task is solved by a fuel cell and a motor vehicle with the features of the independent claims. Therefore, a first aspect of the invention concerns a fuel cell comprising a stack of alternating bipolar plates and membrane electrode assemblies. The fuel cell furthermore comprises flow channels that are formed between a bipolar plate and a membrane electrode assembly, and flow channels that are formed within a bipolar plate. According to the invention, an overflowed surface of at least a part of the flow channels comprises at least a hydrophobic segment and a hydrophilic segment with regard to a cross-section of the flow channel in the range of the extension direction.

Due to the design of the fuel cell according to the invention, drop formation from condensing water is almost completely eliminated. This in turn prevents blockage of the flow channels. In addition, the fuel cell according to the invention prevents the capillary effect from developing within the very small flow channels, which allows water to be discharged with very little force. In particular, the flow pressure of the respective reactant gas is sufficient for discharging the water. In an advantageous way, this leads to the efficiency of the fuel cell remaining stable.

Flow channels in this context are understood to be flow channels for the transport of reactant gases, i.e. anode and cathode gas. They are both in the active range and the inactive range, i.e. the distribution area of the fuel cell and may be designed either closed or opened, especially in the distribution area. Open channels on the one side are then limited by the bipolar plate and on the other side by the membrane electrode assembly (e.g. a gas diffusion layer, a membrane or an electrode). Closed flow channels, on the other hand, are found within a bipolar plate that forms internal flow channels due to its profile structure.

In the context of this invention, an overflowed or overflowable surface is to be understood as the inner circumference of the flow channels, i.e. that part of the surface over which anode and/or cathode gas flows. With regard to the cross-section of the flow channels, this surface is on the inside, i.e. on that side of the cross-section that is facing the center of the flow channels.

Wettability of the overflowed surface is preferably measured by means of a static contact angle of water, so that the surface in the hydrophobic segment has a contact angle of more than 90 degrees and a contact angle of less than 90 degrees in the hydrophilic segment.

In one preferred embodiment of the invention, it is provided that the stack has an inactive area and an active area, with the inactive area, i.e. that area that features no electrode material, and a distribution area for operating media of the fuel cell that serves to supply the active area. The flow channels that are provided with a hydrophilic and a hydrophobic segment according to the invention are preferably arranged in the distribution area of the fuel cell. Usually, bipolar plates have two distribution areas, wherein one serves for the supply of reactant gas into the active area and the other for the discharge of reactant gas from the active area. Especially in the discharge area, there is increased formation and/or condensation of water which had to be removed from the flow channels. The embodiment of the flow channels according to the invention supports the removal of water from the flow channels and thus prevents a collection of water that leads to blockage by drop formation and capillary effect.

In another preferred embodiment of the invention, it is provided that the stack is arranged in such a way that the flow channels substantially run horizontally and at least a part of the hydrophilic segment is arranged at the bottom in gravitational direction. In an advantageous manner, this leads to the film of water collecting at the bottom in gravitational direction, and then is drawn apart due to the very low contact angle there. Gravity then favors the discharge of the water that was formed. This embodiment is particularly advantageous for cathode channels because there is increased water formation at this point. It is therefore particularly preferred that the stack of alternating bipolar plates and membrane electrode assemblies is arranged in such a way that at least a large part of the hydrophilic segments of the cathode channels is arranged at the bottom in one gravitational direction.

The hydrophobic segments are arranged on the bipolar plate and/or the membrane electrode assembly. The hydrophobic segments are arranged on the bipolar plates with a particular advantage, since the bipolar plate is easier to modify compared to the other components of the fuel cell such as, for example, elements of the membrane electrode assembly or the gas diffusion layer with regard to wettability.

It is therefore particularly preferred that the bipolar plate be at least partially hydrophobized. This embodiment has the advantage that a material is used for producing the bipolar plate that is by itself rather more hydrophilic, but is better suited for the production of fuel cell stacks with regard to stability, electrical conductivity and weight. Hydrophobization of the bipolar plate is preferably obtained by coating and/or roughening the surface. There are many methods and materials available, especially for coating, which are well suited for an integration into the production of bipolar plates and/or fuel cells.

In another preferred embodiment of the invention, it is provided that a capillary force $F_K$ of water within the flow channels featuring at least one hydrophilic and at least one hydrophobic segment is at least 50% less than within flow channels with the same geometric design of the cross-section whose overflowed surface has the same wettability in the entire cross-section. Preferably, the capillary force $F_K$ is reduced by 75%, especially by 80%, preferably by 85%, especially by 90%, particularly preferred by 95%, so that the capillary force within the flow channels designed according to the invention is as close to zero as possible. Since the capillary force is the result of a ratio of adhesion forces between the water and the overflowed surface to cohesion forces within the water column, a reduction of the capillary force inside the flow channels leads to a reduction of the static friction of the water on the overflowed surface and thus a lighter and more complete discharge of the condensed water within the flow channels.

The following equations describe a general formula for the capillary force $F_K$:

$$F_K = A p_K \cos\theta$$

$$F_K = \frac{2\pi r \sigma}{g} \cos\theta$$

With regard to a flow channel, the following applies:
A=overflowed surface
$p_K$=capillary pressure
$\theta$=contact angle of water on the surface
r=flow channel radius
$\sigma$=surface tension of water
g=acceleration of gravity.

Within flow channels sharing the same geometry, the same materials and the same cross-section, the resulting capillary force $F_K$ is proportional to the contact angle $\theta$. The capillary force $F_K$ consequently approaches zero when the sum of the cosines of the contact angles $\theta$ at any point of the overflowed surface A within the cross-section of the overflowed surface A approaches zero.

This is preferably realized by a variation of the share of hydrophobic segment compared to the share of hydrophilic ones with regard to the cross-section. Accordingly, in one particularly preferred embodiment of the invention, the capillary force is adjusted via the dimensional ratio of the hydrophobic and the hydrophilic segments, or more precisely, via the hydrophobic and the hydrophilic radius. For the hydrophilic segments, $\cos\theta<0$ applies; for the hydrophobic segments $\cos\theta>0$ applies. If therefore, for example, the amount of the cosine of the contact angles in the hydrophobic segment ($|\cos\theta_{hydrophob}|$) is significantly smaller than the amount of the cosine of the contact angles in the hydrophilic segment ($|\cos\theta_{hydrophil}|$), a reduction of the capillary force $F_K$ can be obtained by an increase in area and/or a radial increase of the hydrophobic segment when a generally homogeneous wettability in the individual segments applies.

It is furthermore preferred that the capillary force $F_K$ be set via the static contact angle of water in the hydrophobic segments. This means that a variation, especially a reduction of the capillary force is preferably obtained by adjusting the static contact angle when the dimensional ratio of the hydrophobic and hydrophilic segments remains constant. Hydrophobicity, i.e. the contact angle for water within the hydrophobic segments is preferably adjusted by the composition of the coating and/or the degree of roughness of the surface of the bipolar plate.

Another aspect of the invention relates to a motor vehicle that features a fuel cell in one of the preferred embodiments.

Additional preferred embodiments of the invention arise from the other features stated in the sub-claims.

The various embodiments of the invention as mentioned in this application may be combined advantageously with one another if not stated otherwise in individual cases.

Figure 2:
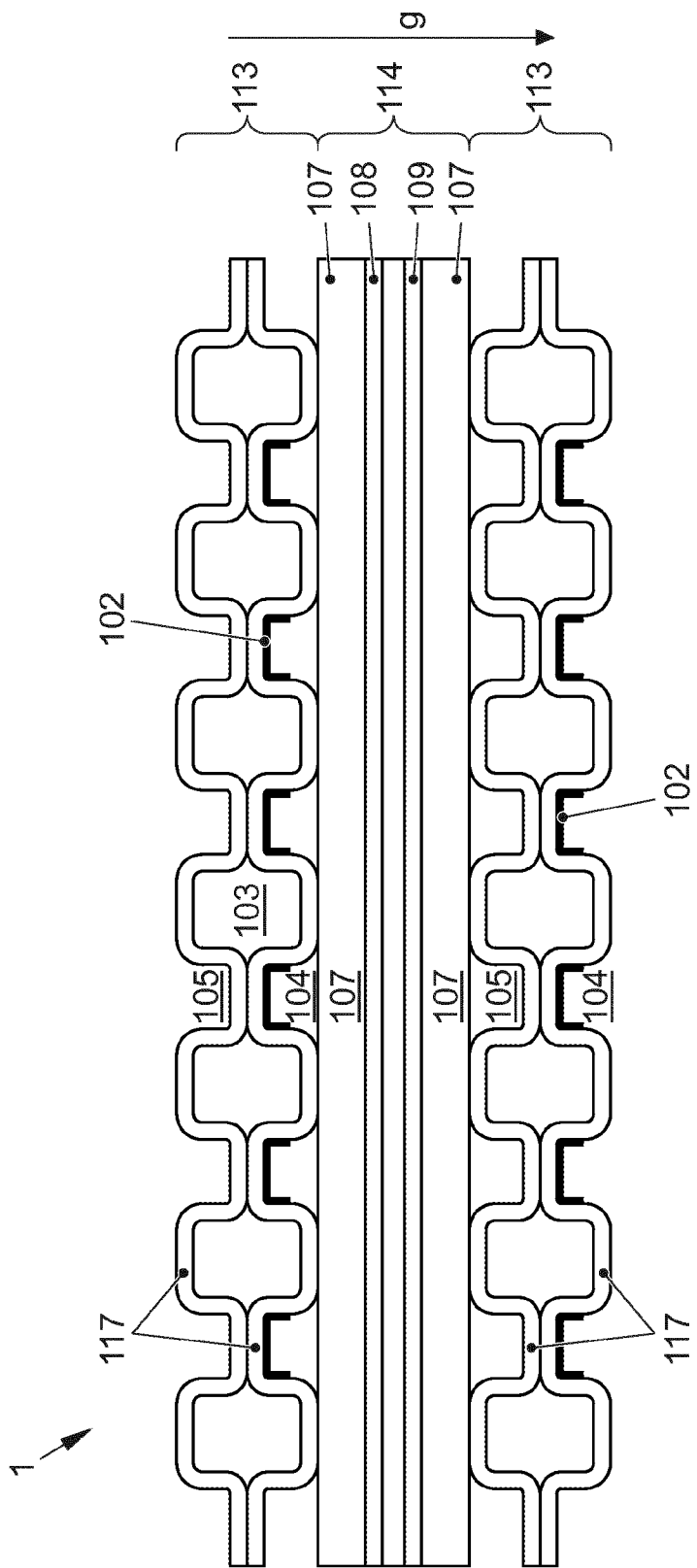
Figure 3:
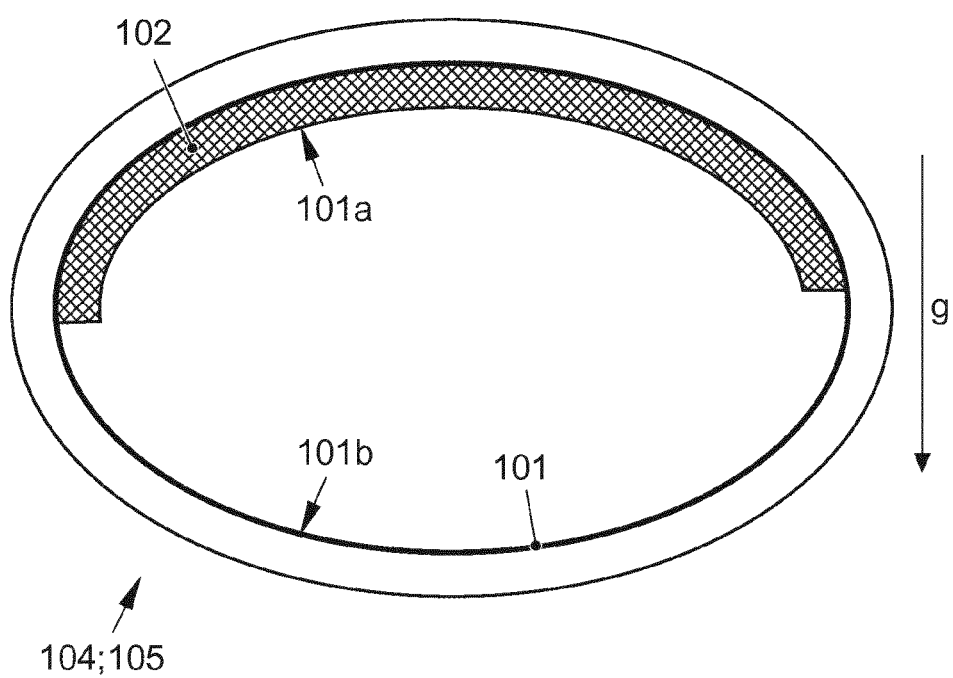

The invention is in the following explained in embodiment examples on the basis of the respective drawings. They show:

FIG. 1 a schematic view of a fuel cell stack,

FIG. 2 a cross section drawing of a fuel cell stack according to the invention in a preferred embodiment, and FIG. 3 a schematic drawing of a cross-section of a flow channel in the preferred embodiment.

FIG. 1 shows a fuel cell stack 1 in a strongly schematic representation. The fuel cell stack 1 comprises first end plate 111 and a second end plate 112. A plurality of stack elements stacked on top of one another is arranged between the end plates 111, 112, which comprise bipolar plates 113 and membrane electrode assemblies 114. The bipolar plates 113 are stacked alternately with the membrane electrode assemblies 114. The membrane electrode assemblies 114 each comprise a membrane 110 and, on both sides of the membrane 115 adjacent electrodes, namely an anode and a cathode (not shown). Adjacent to the membrane 110, the membrane electrode assemblies 114 also may feature gas diffusion layers (also not shown). Between the bipolar plates 113 and the membrane electrode assemblies 114, sealing elements that each are not shown are arranged, which seal the anode and cathode rooms gas-tightly against the exterior. Between the end plates 111 and 112, the fuel cell stack 1 is pressed in by means of tension elements 116, e.g. drawbars or clamping plates.

In FIG. 1, only the narrow sides are visible of the bipolar plates 113 and the membrane electrode assemblies 114. The main faces of the bipolar plates 113 and the membrane electrode assemblies 114 are adjacent to one another. The representation in FIG. 1 is partially not dimensionally accurate. Typically, the thickness of an individual cell consisting of a bipolar plate 113 and a membrane electrode assembly 114 is a few mm, wherein the membrane electrode assembly 114 is by far the thinner component. In addition, the number of individual cells usually is much greater than shown.

A schematic sectional view of an individual cell of the fuel cell stack 1 is shown in FIG. 2.

The fuel cell stack 1 comprises a membrane electrode assembly 114 as a core component, which features the polymer electrolyte membrane 110 as well as one electrode 108, 109 adjacent to each of the two flat sides of the membrane 110, namely an anode 109 and a cathode 108. The membrane 110 is a membrane that preferably is capable of conducting cations, especially protons ($H^+$). The electrodes 108, 109 comprise a catalytic material, e.g. platinum which is supported on an electrically conductive material, e.g. a material on a carbon basis.

Adjacent to the electrodes 108, 109, there is a gas diffusion layer 107 each, which mainly has the task of evenly distributing the added operating gases across the main faces of the electrodes 108, 109 and/or the membrane 110.

There is a bipolar plate 113 arranged on the outer surface of each gas diffusion layer 107, said bipolar plate 113 here being designed by two individual plates 117. Bipolar plates 113 have the task of electrically interconnecting the individual membrane electrode assemblies 114 of the individual cells in the stack, cooling the fuel cell stack 1 and feeding the operating gases onto the electrodes 108, 109. For the latter purpose, the bipolar plate 113 (also referred to as flux field plates) has flux fields. The flux fields comprise, for example, a plurality of flow channels 104 and 105 arranged parallel to each other, worked into the plates 113 in the form of furrows or grooves. Usually, each bipolar plate 113 has an anode flux field on one of its sides, i.e. a plurality of anode flow channels 105 that faces the anode 109, and on its other side a cathode flux field facing the cathode 108 that is composed of a plurality of cathode flow channels 104. A fuel, especially hydrogen ($H_2$) is added to the anode flow channels 105, while an operating resource containing oxygen ($O_2$), especially air, is added to the cathode flow channels 104.

The anode 109 is arranged at the bottom in gravitational direction (g) in the embodiment that is represented, while the cathode 108 is arranged at the top in gravitational direction (g). The cathode flow channels 104 feature a hydrophobic segment 101a in the area of the bipolar plate 113 that is at the top in gravitational direction (g) due to the arrangement of the layer stack consisting of bipolar plate 113/anode 109/membrane 110/cathode 108/bipolar plate 113. Alternatively, the hydrophobic segment 101a may be on a layer of the membrane electrode assembly 114 adjacent to the flow channel 108, 109. In the embodiment shown, the gas diffusion layer 107 corresponds to such a layer.

FIG. 3 shows a strongly schematic detail view of the cross-section of a flow channel 104, 105 in a preferred embodiment of the invention. The cross-section of the flow channel is strongly schematic so that the form and dimensional ratio allow now conclusions as to their function. With regard to FIG. 2, the flow channel that is shown is a cathode flow channel 104. As such, it has a hydrophobic segment 101a on the overflowed surface 102 and a hydrophilic segment 101b of its inner circumference. The hydrophobic segment is arranged at the top in gravitational direction (g) and was generated by coating the overflowed surface 102 in the embodiment shown. The coating is, for example, realized by materials on whose surface alkyl or fluorinated alkyl groups, especially methyl and/or tri-fluor methyl groups are arranged. The number of groups per area assembly is directly related to the hydrophobicity of the surface. The proportion of hydrophobic segment 101a to the hydrophilic segment 101b has been chosen as 1:1 as an example but may vary from flow channel 104, 105 to flow channel 104, 105, for example depending on the wettability of the two segments 101a, b.

The design of the flow channels 104, 105 according to the invention as shown in FIGS. 2 and 3 leads to a reduction of the capillary force $F_K$. Ideally, the adhesion forces between the overflowed surface 101 and the condensed water within the flow channels and the cohesion forces within the condensed water cancel each other out so the resulting capillary force in the flow channel is approaching zero. Condensed water runs off on the hydrophobic segment 101a and precipitates on the hydrophilic segment 101b where it spreads out due to the very small contact angle, i.e. forms none or only very flat drops or a film. Due to the effect of minimal forces such as, for example, the gravitational force (g) or a (low) gas flow, the drops are pushed out of the flow channel 104, 105.

LIST OF REFERENCE SYMBOLS

1 Fuel cell stack
100 Fuel cell
101 overflowed surface
101a hydrophobic segment
101b hydrophilic segment
102 hydrophobic coating
103 coolant channel
104 cathode flow channel
105 anode flow channel
107 gas diffusion layer
108 cathode
109 anode
110 membrane
111 first end plate
112 second end plate
113 bipolar plate
114 membrane electrode assembly
116 electrode

The invention claimed is:

1. A fuel cell, comprising:
a stack of alternating bipolar plates and membrane electrode units;
a plurality of flow channels formed in the bipolar plates, a surface of a part of each of the flow channels includes a hydrophobic segment and a hydrophilic segment with regard to a cross-section of the flow channel, wherein the hydrophobic segment is arranged above the hydrophilic segment, the stack is positioned to have the flow channels run horizontally and at least a part of the hydrophilic segment of each of the flow channels is positioned on a lower portion of the respective flow channel.

2. The fuel cell according to claim 1 wherein the stack includes a distribution area and an active area, and the surface of the part of each of the flow channels that has the hydrophobic and hydrophilic segments is configured to transport reactant gas and is arranged in the distribution area of the stack.

3. The fuel cell according to claim 1 wherein at least a part of the hydrophobic segment is positioned on an upper portion of the flow channels.

4. The fuel cell according to claim 1 wherein the hydrophobic segments are arranged on the bipolar plate.

5. The fuel cell according to claim 4 wherein the hydrophobic segments are developed by hydrophobization of the bipolar plate.

6. The fuel cell according to claim 5 wherein the bipolar plate is hydrophobized by coating and/or roughening of the surface.

7. The fuel cell according to claim 1 wherein a capillary force of water within the flow channels having the hydrophilic and the hydrophobic segments is at least 50% smaller than a capillary force of water within a flow channel with the same geometrical design and cross-section that has a homogeneous wettability across the entire cross-section.

8. The fuel cell according to claim 7 wherein the capillary force of water within the flow channels having the hydrophilic and the hydrophobic segments is adjustable via a dimensional ratio of the hydrophobic segments to the hydrophilic segments.

9. The fuel cell according to claim 7 wherein the capillary force is adjustable via a static contact angle of water of the hydrophobic segments.

10. A motor vehicle, comprising:
a fuel cell that includes:
a plurality of membrane electrode units; and
a plurality of bipolar plates, each of the bipolar plates positioned adjacent to at least one of the membrane electrode units, each plate including:
a plurality of flow channels, at least some of the flow channels including an interior surface having a first portion, a hydrophobic material on the first portion, a second portion, and a hydrophilic material on the second portion, wherein the first portion of the interior surface is arranged above the second portion of the interior surface.

11. The motor vehicle of claim 10 wherein each bipolar plate includes two plates, each of the two plates having a plurality of grooves, the at least some of the flow channels being formed in the pluralities of grooves.

* * * * *